Sept. 1, 1964   J. H. DIEHL ETAL   3,146,628
POWER TOOL AND TRANSMISSION THEREFOR
Filed Dec. 28, 1961   3 Sheets-Sheet 1
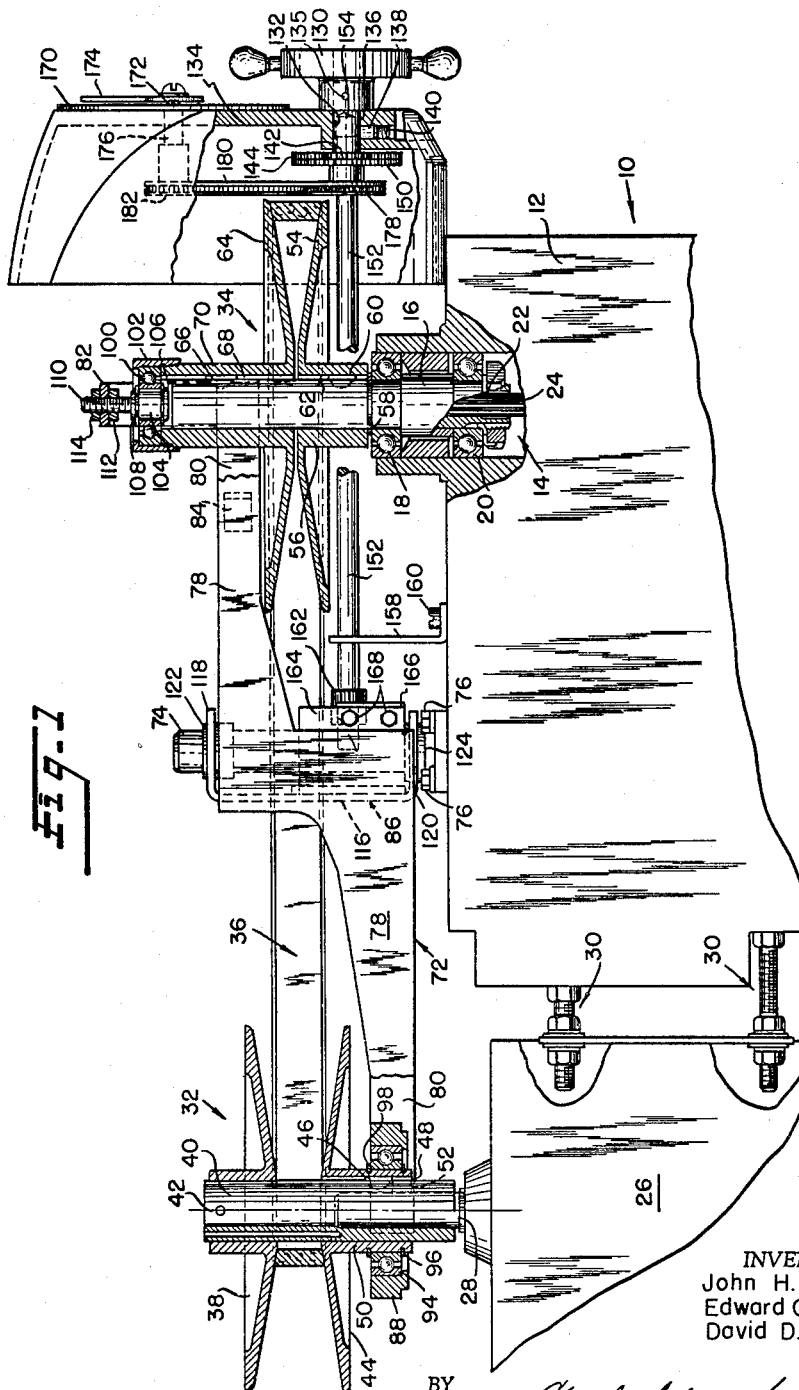
INVENTORS
John H. Diehl
Edward C. Warrick
David D. Pettigrew
BY
ATTORNEYS

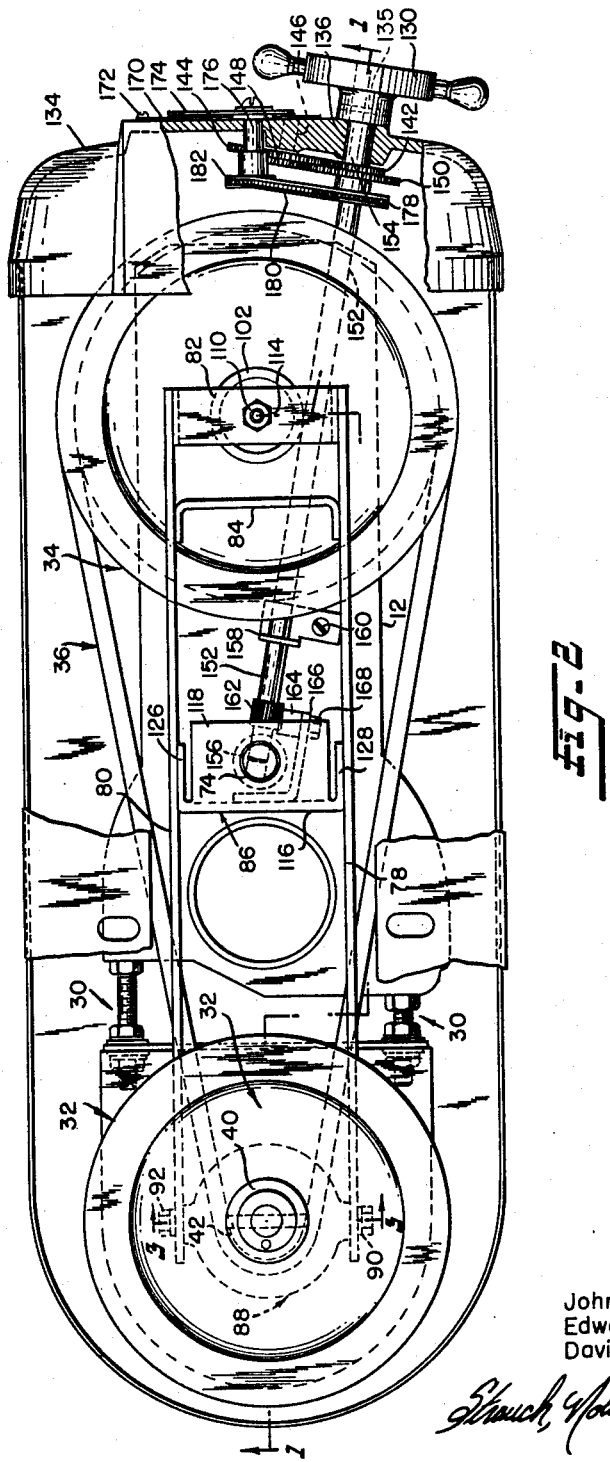

Sept. 1, 1964   J. H. DIEHL ETAL   3,146,628
POWER TOOL AND TRANSMISSION THEREFOR
Filed Dec. 28, 1961   3 Sheets-Sheet 3
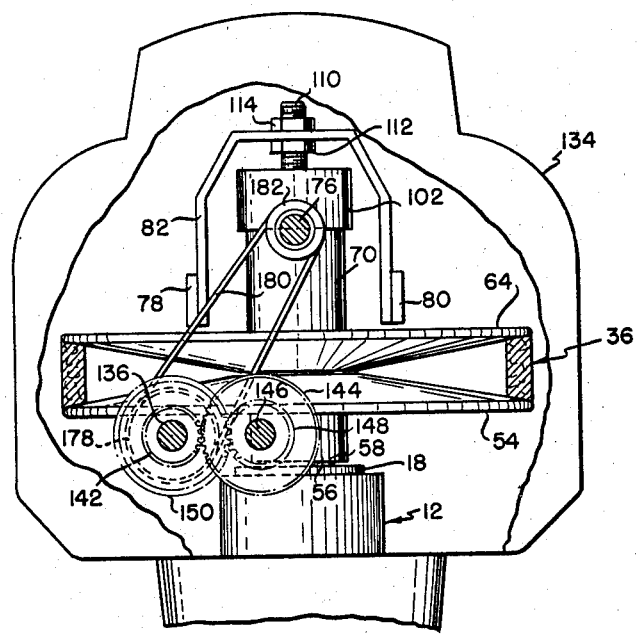
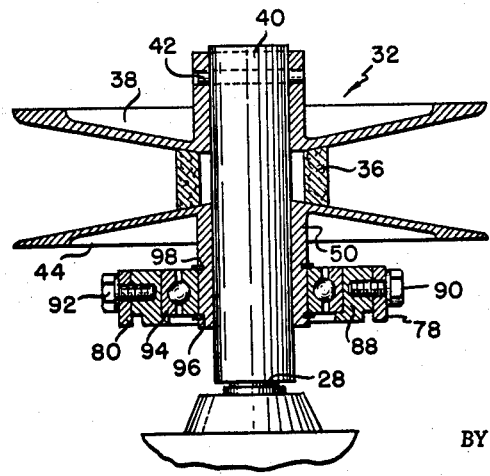
INVENTORS
John H. Diehl
Edward C. Warrick
David D. Pettigrew
BY
ATTORNEYS

United States Patent Office 3,146,628
Patented Sept. 1, 1964

3,146,628
POWER TOOL AND TRANSMISSION THEREFOR
John H. Diehl, Edward C. Warrick, and David D. Pettigrew, Pittsburgh, Pa., assignors to Rockwell Manufacturing Company, Pittsburgh, Pa., a corporation of Pennsylvania
Filed Dec. 28, 1961, Ser. No. 162,847
8 Claims. (Cl. 74—230.17)

The present invention relates to improvements in power tools such as drill presses and the like and more particularly to improvements in variable speed transmissions for such power tools.

As is well known, for drilling a hole of a given size in any given material there is an optimum angular velocity of the drill bit. Incorrect drill bit speeds produce overheating of the drill bit and work piece and unnecessarily shorten the life of the bit. In variable speed drill heads for drill presses as heretofore constructed on a commercial basis, the usual available spindle speed variation has been obtainable by manually shifting a V-belt along opposed step cone pulleys, usually having a maximum of four steps. Such variable speed drives provide only a very limited selection of speeds and it is time consuming and difficult to make the speed change. Despite the inconvenience and difficulty in making the required spindle speed changes, the effect of spindle speed upon the life of drill bits is so important that skilled drill press operators usually utilize the limited number of speed selections that are available. They compensate for the lack of fine spindle speed graduations by varying the rate of longitudinal feed of the spindle into the work piece.

The present invention contemplates the elimination of the inadequacies of spindle speed selection in prior drill heads for drill presses by the provision of an improved infinitely and readily variable change speed transmission drive connecting the spindle to the motor output shaft.

Variable speed V-belt type drives have been known as such for many years as is shown by United States Letters Patent No. 2,395,599, issued February 26, 1946, to J. B. Webb et al., for Multiple Drive Conveyor and the like; No. 2,480,492, issued August 30, 1949, to A. V. Marsow, for Variable Speed Control Mechanism; No. 2,487,980, issued November 15, 1949, to E. J. Otto, for Belt Transmission, and No. 2,604,794, issued July 29, 1952, to F. B. Scott, for Belt Tensioning Device for Variable Speed Drives. Such drives however are large, complicated, expensive and do not provide adequate ranges of speed variations and therefore are not applicable to drill heads for drill presses and to other power tools where a wide range of speed selections is required and the available space is small.

With the foregoing considerations in view, it is the primary object of the present invention to provide an improved drill head having readily adjustable selectively variable spindle speed control transmission.

A further object of the present invention is to provide an improved drill head for drill presses having a variable speed transmission providing an infinite selection of speed ratios between the drive motor and the spindle within a predetermined range of speeds.

A further object of the present invention is to provide an improved drill head for drill presses embodying an improved variable speed transmission which is readily operable to provide a wide variety of speed ratio selections.

A still more specific object of the present invention is to provide, in a drill head for drill presses, an improved rugged low cost variable speed V-belt type transmission interconnecting the drill press motor and spindle and providing an infinite number of speed selections within a predetermined range.

A further object of the present invention is to provide a compact change-speed mechanism providing an infinite number of speed selections over a wide range.

More specifically it is an object of this invention to provide a compact inexpensive variable speed V-belt transmission embodying oppositely facing pulley sheave halves fixed respectively to the transmission input and output shafts and cooperating with oppositely facing axially shiftable split sheave pulley halves mounted for conjoint axial displacement.

These and other objects of the present invention will become more fully apparent by reference to the appended claims and as the following detailed description proceeds in reference to the accompanying drawings wherein:

FIGURE 1 is a side elevational view partially in section of the upper portion of a drill head illustrating a variable speed V-belt type transmission in accord with the present invention interconnecting the drill head drive motor and spindle;

FIGURE 2 is a top plan view of the structure illustrated in FIGURE 1;

FIGURE 3 is a fragmentary sectional view taken substantially along the line 3—3 of FIGURE 2;

FIGURE 4 is a front elevational view of the structure of FIGURE 1.

Referring now to the drawings in detail and particularly to FIGURE 1, the present invention is illustrated as applied to a drill press of the general form illustrated in United States Patent 2,567,982, issued September 18, 1951, to C. A. Wiken, for Machine Tool.

As is illustrated in FIGURE 1, the drill head 10 comprises a head casting or body member 12 at the forward end of which is journaled a spindle 14 comprising an upper spindle portion 16 journaled on the casting 12 by axially spaced ball bearing type anti-friction bearings 18 and 20 and a lower coaxial spindle portion 22 suitably mounted upon the casting 12 by a quill (not shown) in the conventional manner and splined to the upper spindle portion 16 by longitudinally extending splines as indicated at 24. An electric drive motor 26, the output shaft 28 of which is at least substantially parallel to the axis of the spindle 14, is secured to the casting 12 by mounting studs 30 in the conventional manner.

The output shaft 28 of the motor 26 is drive connected to the spindle 14 by a selectively variable change speed transmission of the V-belt type comprising a split sheave pulley assembly 32 mounted upon the motor output shaft 28, a split sheave pulley assembly 34 mounted upon the upper spindle portion 16 of the spindle 14, and a V-belt 36 interconnecting pulley assemblies 32 and 34.

Pulley assembly 32 comprises an upper sheave half 38 rotatively and axially fixed to a sleeve 40 by a dowel pin 42, a moveable sheave half 44 mounted on the sleeve 40 for axial movement therealong and restrained against rotation relative thereto by a key 46 fixed to the sleeve 40 and engaging the axially extending keyway 48 within the bore of the hub 50 of the moveable sheave half 44. The sleeve 40 is slidably received upon and fixed to the motor output shaft 28 by a set screw 52.

The split sheave pulley assembly 34 comprises a lower axially fixed sheave half 54 the hub 56 of which rests upon a flange 58 integral with the spindle upper portion 16 and is fixed for rotation with the spindle portion 16 by a key 60 projecting from its periphery and engaging a longitudinally extending keyway 62 formed in the interior wall of the bore of the hub 56. The upper or axially moveable sheave half 64 is connected to the upper spindle portion 16 for rotation therewith by a key 66 fixed to the spindle portion 16 and engaging the longitudinally extending keyway 68 in the bore of the hub 70 of the sheave half 64.

The axially moveable sheave halves 44 and 64 are connected for concomitant axial displacement by a bracket 72 mounted for rectilinear motion in a path parallel to the parallel axes of the output shaft 28 and the spindle 14 upon a cylindrical mounting pin or stud 74 fixed to the top of the casting 12 by screws 76 and the axis of which is parallel to the axes of the motor output shaft 28 and the spindle 14.

As is apparent from a comparison of FIGURES 1 and 2, the bracket 72 embodies a pair of elongated side members 78 and 80, each of the configuration illustrated in FIGURE 1 for the member 78. The members 78 and 80 are interconnected at their forward end by an inverted U-shaped bracket 82 and a reinforcing U-shaped bracket 84, adjacent their centers by a mounting bracket 86 and at their rearward end by an annular collar 88 fixed therebetween by mounting screws 90 and 92.

As is apparent from FIGURE 1, the collar 88 supports an anti-friction bearing such as ball bearing 94 the inner race of which is axially confined with respect to the hub 50 of the sheave half 44 by retainer rings 96 and 98. The other moveable sheave half 64 is rotatably suspended from the bracket 82 by an anti-friction type bearing such as ball bearing 100 the outer race of which is retained against the upper end of the hub 70 of sheave half 64 by an internally shouldered and threaded retainer ring 102 and the inner race of which is supported upon a stub shaft 104 by retainer rings 106 and 108. Stub shaft 104 is suspended from bracket 82 by its threaded extension 110 which is secured to the bracket 82 by opposed jam nuts 112 and 114.

The central bracket 86, as is apparent from FIGURE 1, has a vertically extending wall 116 lying parallel to the axis of the pin 74 and top and bottom flanges 118 and 120 which are suitably apertured and support bearing bushings 122 and 124 respectively which are axially slidably received upon the pin 74. The bracket 86 has forwardly extending side flanges 126 and 128 lying parallel to the members 78 and 80 and is joined thereto by welding. The brackets 84 and 82 are similarly welded to the members 78 and 80 at their opposite ends to provide a rigid assembly.

As is apparent, therefore, upward movement of the bracket 72 along the pin 74 will lift the moveable sheave halves 44 and 64 to increase the effective diameter of the split sheave pulley 32 and reduce the effective diameter of the split sheave pulley 34 and downward movement of the bracket 72 will produce the reverse effect.

The movement of the bracket 72 is controlled by a hand wheel or crank 130 located at the front end of the drill press and journaled within a bore 132 in the belt guard casting 134 which is fixed to the head casting 12 in the conventional manner. The speed adjustment can be made only while pulleys 32 and 34 are rotating without injury to the mechanism. Accordingly, crank 130 is fixed by a shear pin 135 to a short shaft 136 journaled in the bore 132 to prevent damage to the mechanism by attempted speed adjustment while motor 26 is "off." Shaft 136 is frictionally retained against rotation in bore 132 by a friction brake pad 138 pressed against its periphery by a screw 140 to prevent inadvertent or spindle load induced rotation of the crank 130 or its shaft 136. Shaft 136 is connected to move the bracket 72 up and down by a drive train comprising, as is best shown in FIGURE 2, a pinion 142 fixed to the shaft 136, a gear 144 in constant mesh with pinion 142 and mounted for rotation about the axis of a shaft 146 parallel to the axis of shaft 136, a pinion 148 mounted for rotation with the gear 144, a gear 150 in constant mesh with the pinion 148 and mounted upon a shaft 152. Shaft 152 is journaled at one end within the coaxial end bore 154 (see FIGURE 1) in the shaft 136, at the other end in a bore 156 (FIGURE 2) formed in the pin 74 and by a bracket 158 fixed to the top of the casting 12 by screws 160. A pinion 162 is fixed to shaft 152 between bracket 158 and the pin 74. Bracket 158 prevents deflection of shaft 152 upon loading of pinion 162. Pinion 162 is in constant mesh with a vertically extending rack 164. Rack 164 is fixed to a bracket 166 by screws 168. Bracket 166 is fixed to the upstanding wall 116 of the bracket 86 as by welding.

By this construction, rotation of the crank 130 in a clockwise direction will produce clockwise rotation of the shaft 152 and elevate the bracket 72 to increase the speed of the spindle and counter-clockwise rotation of the crank 130 will lower the bracket 78 and decrease the spindle speed.

In order to provide a direct reading indication of the selected spindle speed, a dial plate 170 is fixed to the front face of the belt guard casting 134 by screws 172 and a pointer 174 cooperating therewith is fixed to a shaft 176 journaled in the casting 134. Shafts 152 and 176 are drive connected by a chain and sprocket drive comprising a sprocket 178 fixed to the shaft 152, chain 180, and a sprocket 182 fixed to the shaft 176. As will be noted, the axis of shaft 176 is not parallel to that of the shaft 152. It has been found that with the slow speed of this drive and using a ladder type chain the drive coupling is effective to provide an accurate indication of the selected spindle speed without the need of a more expensive drive coupling.

Referring again to FIGURE 1, it is extremely important that any given movement of the rack 164 produce the same magnitude of movement of both sheave halves 44 and 64. If this does not occur, a speed ratio other than that selected will result. To this end, the members 78 and 80 are formed as illustrated in FIGURE 1 for member 78 so that deflection of their ends with respect to each other and to their central portions connected to post 74 is precluded. The brackets 86, 84, and 82 and ring 88 contribute to maintaining bracket 72 completely rigid during its adjustment and under all magnitudes of loadings of the drill bit supporting spindle 14. The central location of post 74 and its rigid mounting upon casting 12 positively prevent displacement of bracket 72 transversely of the axes of pulleys 32 and 34 thereby preventing load variation induced changes in the speed ratio between pulleys 32 and 34.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In combination:
   (a) a body;
   (b) a spindle rotatably mounted on said body;
   (c) a drive motor mounted on said body, said drive motor having an output shaft rotatable about an axis parallel to the spindle rotation axis;
   (d) a variable speed transmission interconnecting said motor output shaft and said spindle, comprising:
     (d1) a first split sheave pulley mounted on the motor output shaft and having a sheave half axially shiftable therealong; and
     (d2) a second split sheave pulley coaxial with and drive connected to the spindle and having a sheave half axially shiftable relative thereto; and
   (e) means manipulatable from the exterior of said body for varying the speed of said transmission, including:
     (e1) a bracket mounted for rectilinear movement parallel to said shaft and spindle axes and interconnecting said axially shiftable sheave halves for concomitant axial displacement;
(e2) a rack fixed to said bracket;
(e3) a pinion in constant mesh with said rack;
(e4) first and second relatively rotatable, axially aligned shafts, said first shaft mounting said pinion for rotation about an axis fixed relative to said body, said second shaft extending through and adapted at its outer end for rotary manipulation for speed adjustment purposes and being rotatably supported by said body; and
(e5) a gear reduction drive train drive-connecting said shafts to prevent rotation of said second shaft in response to loading or vibration of said bracket.

2. The combination as defined in claim 1, wherein said gear reduction drive train includes:
(a) a first pinion fixed to said second shaft;
(b) a second pinion in constant mesh with said first pinion;
(c) a third pinion rotatively fixed to said second pinion;
(d) a shaft extending from said body and supporting said second and third pinions for rotation about an axis parallel to the rotation axes of said shafts; and
(e) a fourth pinion rotatively fixed to said first shaft, said fourth pinion being in constant mesh with said third pinion.

3. The combination as defined in claim 1 including brake means cooperating with said second shaft and said drive train to prevent vibration induced rotation of said second shaft and a consequent variation in the speed of said transmission.

4. The combination as defined in claim 3:
(a) including an aperture in said body extending from the exterior thereof to said second shaft;
(b) a brake pad in said aperture; and
(c) stop means in said aperture pressing said brake pad against said second shaft.

5. The combination as defined in claim 1, including:
(a) a handle on the end of said second shaft exteriorly of said body; and
(b) a shear pin extending between and rotatively connecting said handle and said second shaft to prevent damage to said speed varying means by attempted adjustment of said speed with said transmission at rest.

6. In combination:
(a) a body;
(b) a spindle rotatably mounted on said body;
(c) a drive motor movably mounted on and normally fixed to said body and having an output shaft rotatable about an axis parallel to the spindle rotation axis;
(d) a variable speed transmission interconnecting said motor output shaft and said spindle, comprising:
(d1) a first split sheave pulley mounted on the motor output shaft and having a sheave half axially shiftable therealong;
(d2) a second split sheave pulley coaxial with and drive-connected to the spindle and having a sheave half axially shiftable relative thereto; and
(d3) a bracket mounted for rectilinear movement parallel to the shaft and spindle axes and interconnecting said axially shiftable sheave halves for concomitant axial displacement, said bracket having side members on opposite sides of said first split sheave pulley; a collar extending between and pivotably fixed to said side members, said collar rotatably supporting the axially shiftable sheave half of said first pulley; and selectively releasable means permitting adjustment of the collar relative to said bracket side members, whereby the relationship between said axially shiftable sheave half and said bracket may be varied to accommodate variations in relative alignment of said spindle and said motor shaft; and
(e) means manipulatable from the exterior of the body for varying the speed of said transmission.

7. In combination:
(a) a body;
(b) a spindle rotatably mounted on said body;
(c) a drive motor mounted on said body and having an output shaft rotatable about an axis parallel to the spindle rotation axis;
(d) a variable speed transmission interconnecting said motor output shaft and said spindle, comprising:
(d1) a first split pulley mounted on the motor output shaft and having a sheave half axially shiftable therealong; and
(d2) a second split sheave pulley coaxial with and drive-connected to the spindle and having a sheave half axially shiftable relative thereto; and
(e) means for varying speed of said transmission including a bracket mounted for rectilinear movement parallel to said shaft and spindle axes and interconnecting said axially shiftable sheave halves for concomitant axial displacement, said bracket having a rigid construction precluding independent motion of said axially displaceable pulley sheave halves provided by:
(e1) a pair of parallel, spaced apart rigid side members;
(e2) a rigid bracket connecting first ends of said side members;
(e3) a collar connecting the other ends of said side members;
(e4) a reinforcing bracket between and fixed to said side members adjacent but spaced from said connecting brackets; and
(e5) a central mounting bracket between and fixed to said side members.

8. In combination:
(a) a body;
(b) a spindle rotatably mounted on said body;
(c) a drive motor mounted on said body, said drive motor having an output shaft rotatable about an axis parallel to the spindle rotation axis;
(d) a variable speed transmission interconnecting said motor output shaft and said spindle, comprising:
(d1) a first split sheave pulley mounted on the motor output shaft and having a sheave half axially shiftable therealong;
(d2) a second split sheave pulley coaxial with and drive connected to the spindle and having a sheave half axially shiftable relative thereto;
(d3) a V-belt drive connecting said first and second split sheave pulleys;
(d4) a guide post fixed to said body with its longitudinal axis parallel to the longitudinal axes of the spindle and the motor output shaft; and
(d5) a bracket mounted for sliding movement on said guide post and interconnecting said axially shiftable sheave halves for concomitant axial displacement; and
(e) means manipulatable from the exterior of said body for varying the speed of said transmission, including:
(e1) a rack fixed to said bracket;
(e2) rotatable shaft means including a pair of axially aligned shafts;
(e3) a pinion fixed to one of said shafts adjacent one end thereof and drivingly engaging the rack;

(e4) the other of said shafts extending through said housing and supporting an end of said one shaft;

(e5) journal means for said one shaft adjacent each side of said pinion to prevent load induced deflection of the shaft; and (e6) a gear reduction drive train drive connecting said shafts to prevent rotation of said other shaft in response to loading of said one shaft through rack and pinion.

References Cited in the file of this patent

UNITED STATES PATENTS 2,233,822    Schubbe _____ Mar. 4, 1941

UNITED STATES PATENT OFFICE
CERTIFICATE OF CORRECTION

Patent No. 3,146,628                  September 1, 1964

John H. Diehl et al.

It is hereby certified that error appears in the above numbered patent requiring correction and that the said Letters Patent should read as corrected below.

Column 6, line 40, for "brackets" read -- bracket --; column 8, line 3, before "rack" insert -- said --.

Signed and sealed this 22nd day of December 1964.

(SEAL)
Attest:

ERNEST W. SWIDER
Attesting Officer

EDWARD J. BRENNER
Commissioner of Patents